Figure 1:
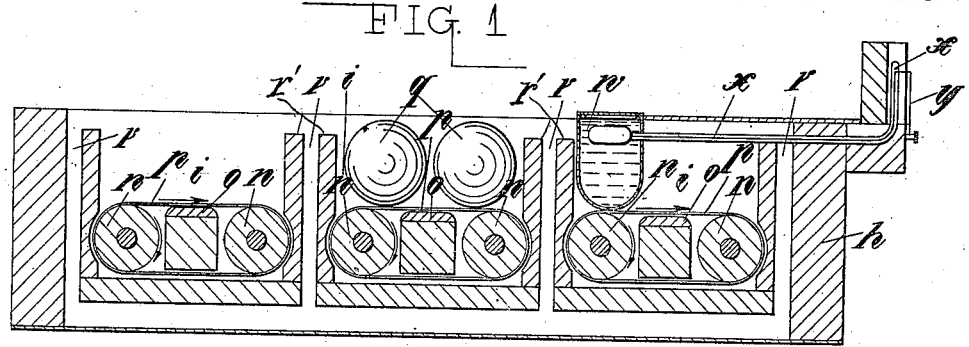

W. BACHMANN.
HATCHING APPARATUS FOR EGGS.
APPLICATION FILED MAR. 17, 1910.

987,686.

Patented Mar. 28, 1911.
2 SHEETS—SHEET 1.

Witnesses:
W. R. Schulz
E. H. Schorr.

Inventor:
Walter Bachmann
by his attorneys
Bresen & Zumpe

W. BACHMANN.
HATCHING APPARATUS FOR EGGS.
APPLICATION FILED MAR. 17, 1910.
987,686.
Patented Mar. 28, 1911.
2 SHEETS—SHEET 2.
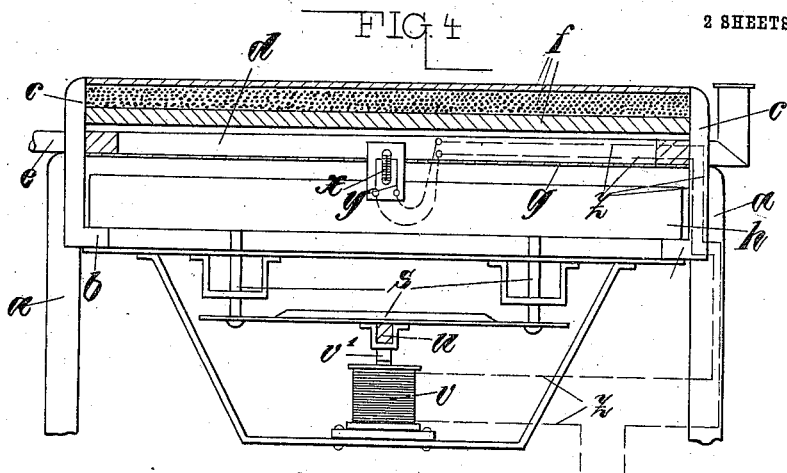
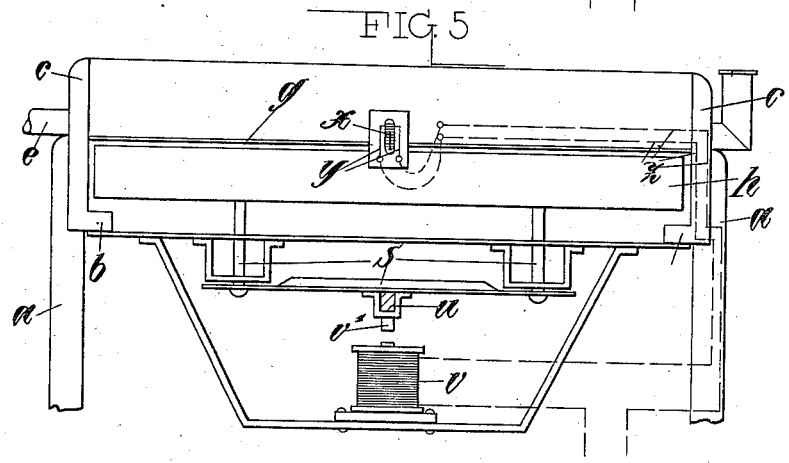
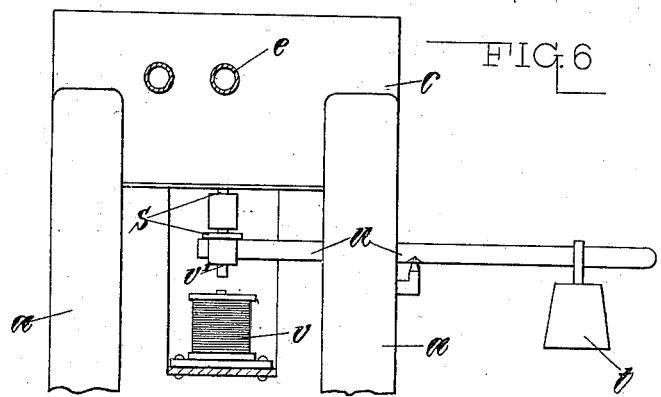
Witnesses:
W. R. Schulz
C. H. Schorr.
Inventor:
Walter Bachmann
by his attorneys
Briesen & Zumpe

UNITED STATES PATENT OFFICE.

WALTER BACHMANN, OF LANGENGROBSDORF, GERMANY.

HATCHING APPARATUS FOR EGGS.

987,686. Specification of Letters Patent. Patented Mar. 28, 1911.

Application filed March 17, 1910. Serial No. 550,045.

*To all whom it may concern:*

Be it known that I, WALTER BACHMANN, a subject of the German Emperor, and resident of Langengrobsdorf, Germany, have invented a new and Improved Hatching Apparatus for Eggs, of which the following is a specification.

To attain favorable results with hatching-apparatuses and to brood chickens which, as to vitality, are equal to those hatched by a hen it is necessary that as far as possible the natural conditions are imitated, and this requirement is complied with to a great extent with the hatching-apparatus constituting this invention.

The hen sitting on the egg turns the latter instinctively from time to time by a movement of the body, so that the germ, which is always floating upon the surface, does not dry fast on the shell. In order to obtain a like result, the eggs are placed upon an endless apron, supported upon rollers to which motion is imparted from time to time, so that the eggs will be turned whenever necessary. The movement of the rollers may be advantageously brought about by means of a hand-crank, and as a matter of course, not continually but intermittingly, as is also the case with the hen, inasmuch as the eggs are turned by same only from time to time.

It is of special importance that the eggs are, as is the case with the hen, brooded by touching—and not by radiant—warmth, and that they are receiving during this process such a supply of air as corresponds with nature. To attain this object the eggs are situate in chambers that are only open at the top, and the walls of which are so low that the eggs are projecting over them with their upper part, and as a consequence rising fresh air can join the germ by slits situate between the chambers, while as for the rest the eggs are surrounded by carbonic acid secreted from them. This is also the case in an ordinary nest, and, therefore, it is necessary to have the egg-shells softened by carbonic acid. The latter can, however, not fully cover the eggs and thus smother the germ inasmuch as it flows immediately downward as soon as it reaches the upper border of the walls of the chambers.

A receptacle containing warm water serves for instance as source of warmth. Same has to be sufficiently isolated in an upward direction and covered downward or toward the eggs with a paste-board or similar cover against which the eggs are bearing. The latter are hereby protected against breakage, and moreover the warmth has not so intense an effect as if the eggs are bearing directly against the metallic heating-body.

An uninterrupted warming is not of advantage to the eggs, and, therefore, the hen takes instinctively good care by temporarily leaving the nest for a certain cooling of the eggs as soon as she feels that the temperature in the nest is becoming too high. To also imitate here with a hatching-apparatus the natural conditions the eggs must be removed in an automatic way answering the purpose, from the source of warmth, as soon as the thermometer provided for the observation of the temperature shows the overpassing of an admissible limit.

Two wires are arranged with this invention in the place where the upper end of the quicksilver-column of the thermometer is situate. They belong to an electric circular current in which is situate besides the source of current an electro-magnet, the anchor of which is located on the floor of the chambers of eggs, which chambers are capable of being jointly shoved in a perpendicular way and are pressed upward by a weight. If the circular current is closed in consequence of the production of a conducting-connection between the two ends of the wire by the quicksilver, the electro-magnet attracts its anchor, and as a consequence the chambers of eggs are lowering, so that fresh air can pass over the eggs. Owing to the subsequent cooling the column of quicksilver contracts again, the current becomes interrupted, and the chambers of eggs are neared again by the weight to the source of warmth. Thus it occurs that the conditions are exactly equal to those of natural hatching, and accordingly the results attained are very good.

The drawing represents such a hatching-apparatus in a form given as example for execution.

Figure 2:
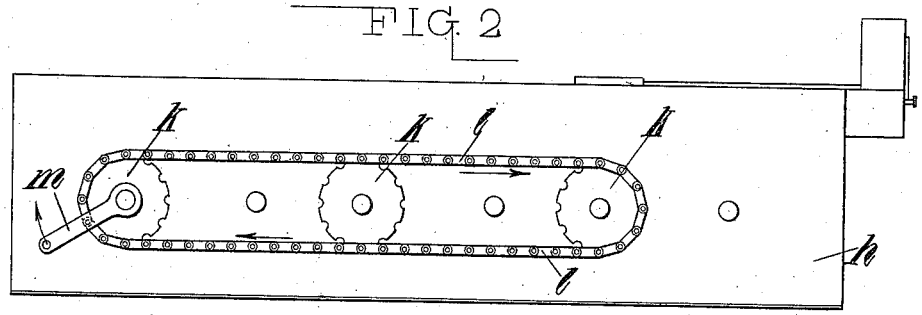
Figure 3:
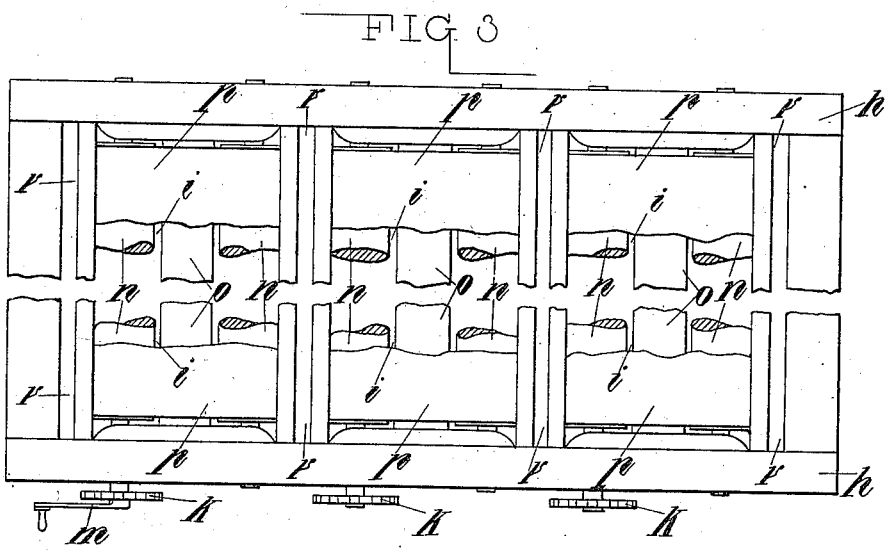

Figure 1 is a longitudinal cut of the chambers of eggs, Fig. 2 a side view of the apron driving mechanism. Fig. 3 shows a part of the chambers as seen from above. Figs. 4 and 5 represent the whole hatching-apparatus, as seen from the side and with lowered or raised chambers of eggs in a smaller measure. Fig. 6 is a front-view to Fig. 5.

The heating-body $d$ with the supplying-tube $e$ formed conformable to the purpose by tubes bent in serpentine windings rests on the feet $a$ between the front-walls $c$, showing beneath a projecture $b$. Upward it is provided with a multiplex isolation $f$ (Fig. 4), and downward it is covered with a paste-board or a similar layer $g$. Between walls $c$ there is arranged a vertically movable frame $h$, provided with a plurality of chambers $i$ which are adapted to contain the eggs. Within each chamber $i$ are journaled a pair of rollers $n$ which may be simultaneously turned by handle $m$ through sprocket wheels $k$ and chain $l$. An endless band or apron $p$ of stuff or the like, and being supported by the bolster $o$, is stretched over the rollers $n$. The eggs $q$ rest on the band and are consequently turned as soon as the band $p$ moves. Chambers $i$ are separated from each other by partitions $i'$ extending between the chambers. Each of these partitions is doubled, to form an air space $r$ that communicates at its bottom with the atmosphere and delivers it to the top of the eggs within two adjoining chambers. Similar air spaces are formed between the end walls of the flanking egg chambers and the walls of the frame. The height of the wall of the chambers is so chosen that the upper end of the egg where the germ is situated is projecting over the walls and accordingly accessible to the very oxygenous air arising from the slits $r$ after the passage of a piece of cloth closing the frame $h$ in a downward direction, so that the germ can take up so much oxygen as is wanted. Properly speaking, there is not existing here a current of air which would cool the eggs in a detrimental manner but the air approaches the eggs only to such an extent as is necessary to cover their want of oxygen.

The eggs are, as is known, emitting oxygen and must be always surrounded by same in their lower part, while an overflowing of the entire egg would lead to a destruction of the germ, and it is especially for this reason that the walls of the chambers have a lower height than the eggs because the chambers can then fill with the heavy oxygen. The latter flows, however, downward through the slits of air as soon as it has reached the upper edge of the walls of the chambers.

To be able to remove from time to time in an automatic way, and as soon as the temperature in the hatching-apparatus oversteps a certain degree, the eggs from the source of warmth in the immediate neighborhood of which they are always situated (Figs. 5 and 6), such an arrangement is made that there is fastened at the traverse $s$ placed at the bottom of the chamber of eggs and sliding in guides firstly, a scale-beam $u$ pressed upward by the weight $t$, and secondly the anchor $v^1$ of a firmly located electro-magnet $v$. The latter is incited to action by a closure of the current and then attracts the anchor and at the same time the chamber of eggs and keeps same in the deep position until the current is interrupted again. The closure of the current occurs, however, if the thermometer $x$, partly lying in a water-bath $w$ (Fig. 1), indicates the overpassing of a certain temperature, because the quicksilver-column produces in this case a guiding connection between the two ends of the wire $y$ melted down in the thermometer, and the current coming from its unmarked source flows through the conduction $z$, thereby inciting the electro-magnet to action. After some time the column of quicksilver is sinking in consequence of a gradually lower temperature, and inasmuch as the current is then interrupted the electro-magnet discharges again its anchor, respectively, the chambers of eggs, and these move upward under the action of the weight $t$, and as a consequence are now subject again to the influence of the source of warmth. This process repeats itself from time to time, and if the eggs are then oftener turned by moving around the crank $m$, the former develop exactly in the same manner as if hatched by a hen.

Patent claims.

1. A hatching apparatus comprising a frame, a plurality of inclosed egg chambers, a series of double partitions extending between the chambers and having air spaces that communicate at their bottoms with the atmosphere and at their tops with two adjoining chambers, and air spaces formed between the frame and the end walls of the flanking egg chambers.

2. In a hatching apparatus, a vertically movable egg chamber, a heating body arranged in proximity thereto, and temperature-controlled means for automatically varying the distance between the chamber and the heating body.

3. In a hatching apparatus, a vertically movable frame, a series of egg chambers carried thereby, a heating body arranged in proximity to said chambers, means for normally raising the frame toward the heating body, and a thermometrically actuated electromagnet for lowering the frame at a predetermined temperature of the egg chambers.

In testimony whereof I affix my signature.

WALTER BACHMANN.

In the presence of—
F. HENHERN,
CHARLES NEUER.